(12) United States Patent
Brakensiek et al.

(10) Patent No.: US 9,817,479 B2
(45) Date of Patent: Nov. 14, 2017

(54) METHOD AND APPARATUS FOR INTERPRETING A GESTURE

(75) Inventors: Jorg Brakensiek, Mountain View, CA (US); Raja Bose, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 31 days.

(21) Appl. No.: 13/404,107

(22) Filed: Feb. 24, 2012

(65) Prior Publication Data

US 2013/0222223 A1    Aug. 29, 2013

(51) Int. Cl.
| | | |
|---|---|---|
| *G06F 3/01* | (2006.01) | |
| *G06F 3/0488* | (2013.01) | |
| *G06F 3/14* | (2006.01) | |
| *B60K 35/00* | (2006.01) | |
| *B60K 37/06* | (2006.01) | |

(52) U.S. Cl.
CPC ............. *G06F 3/017* (2013.01); *B60K 35/00* (2013.01); *B60K 37/06* (2013.01); *G06F 3/04883* (2013.01); *G06F 3/1454* (2013.01); *B60K 2350/1052* (2013.01); *G09G 2370/022* (2013.01); *G09G 2380/10* (2013.01)

(58) Field of Classification Search
CPC ....................................................... G06F 3/048
USPC ................................... 345/173–179; 715/863
See application file for complete search history.

(56) References Cited

U.S. PATENT DOCUMENTS

| 2009/0140986 | A1* | 6/2009 | Karkkainen | .......... G06F 3/0486 345/173 |
|---|---|---|---|---|
| 2009/0225038 | A1* | 9/2009 | Bolsinga | ............. G06F 3/04883 345/173 |
| 2010/0122167 | A1 | 5/2010 | Ryu | |
| 2010/0169842 | A1 | 7/2010 | Migos | |
| 2010/0245260 | A1* | 9/2010 | Louch | .......................... 345/173 |
| 2010/0287513 | A1* | 11/2010 | Singh | .................... G06F 3/0488 715/863 |
| 2011/0214162 | A1 | 9/2011 | Brakensiek et al. | |
| 2011/0224842 | A1 | 9/2011 | Quinn et al. | |
| 2011/0246891 | A1 | 10/2011 | Schubert et al. | |
| 2011/0270600 | A1 | 11/2011 | Bose et al. | |

(Continued)

OTHER PUBLICATIONS

International Search Report and Written Opinion for Application No. PCT/FI2013/050104; dated Jul. 18, 2013.

(Continued)

*Primary Examiner* — Alexander Eisen
*Assistant Examiner* — Cory Almeida
(74) *Attorney, Agent, or Firm* — Alston & Bird LLP

(57) ABSTRACT

A method, apparatus and computer program product are provided to facilitate user interaction with a display that is capable of presenting at least portions of the user interfaces of multiple devices, such as by recognizing and interpreting a gesture as providing input to one of the devices. In the context of a method, an identification of one or more valid gestures of at least a first device is received in an instance in which a plurality of devices interact such that portions of the respective user interfaces are capable of being presented upon a display. The method also includes receiving information indicative of a gesture and determining whether the gesture is valid. Depending upon whether the gesture is a valid gesture, the method also includes causing an indication of the gesture to be provided to the first device.

20 Claims, 6 Drawing Sheets

(56) References Cited

U.S. PATENT DOCUMENTS

| | | | |
|---|---|---|---|
| 2011/0271183 A1 | 11/2011 | Bose et al. | |
| 2012/0005632 A1* | 1/2012 | Broyles et al. | 715/863 |
| 2012/0216152 A1 | 8/2012 | Li | |
| 2014/0033134 A1* | 1/2014 | Pimmel | H04L 67/1074 |
| | | | 715/863 |
| 2014/0136986 A1* | 5/2014 | Martin et al. | 715/748 |

OTHER PUBLICATIONS

"*Lexus—RX—Remote Touch*;" Lexus Europe ; originally retrieved from <http://www.lexus.co.uk/rang/rx/key-features/interior/interior-remote-touch.aspx> currently retrieved on Aug. 12, 2013 from <http://web.archive.org/web/20120303062841/http://www.lexus.co.uk/range/rx/key-features/interior/interior-remote-touch.aspx>.

Alpine Electronics of America, Inc. [online] [retrieved May 7, 2012]. Retrieved from the Internet: <URL: http://www.alpine-usa.com/product/view/ixa-w404/>. 5 pages.

Point & Click [online] [retrieved May 10, 2012]. Retrieved from the Internet: <URL : http://drivers.lexus.com/lexusdrivers/magazine/articles-Vehicle-Insider/Remote-Touch-Sys . . . >. 3 pages.

Extended European Search Report for corresponding European Application No. 13752519 dated Jun. 24, 2015, 10 pages.

European Office Action for corresponding European Application No. 13 752 519.2 dated Jun. 9, 2016, 11 pages.

Summons to Attend Oral Proceedings from corresponding European Patent Application No. 13752519.2 dated Mar. 7, 2017.

\* cited by examiner

METHOD AND APPARATUS FOR INTERPRETING A GESTURE

TECHNOLOGICAL FIELD

An example embodiment of the present invention relates generally to user interface technology and, more particularly, to techniques for interpreting a gesture.

BACKGROUND

A wide variety of electronic devices may be utilized for various purposes. Many of these electronic devices have a user interface that provides information to the user and/or that receives input from a user. In some instances, a user may desire to concurrently utilize two or more electronic devices. In instances in which each of the electronic devices has its own respective user interface, the user may find it challenging to interact with the user interfaces of each of the electronic devices in a timely and efficient manner. As such, some electronic devices interact with one another such that portions of the user interface of each of the electronic devices are presented upon the same display, such as the display of one of the electronic devices. As such, a user may interact with each of the electronic devices by reference to the display and, more particularly, by interacting with the portions of the user interfaces of the electronic devices that are presented upon the display.

By way of example, some vehicles may include a head unit, such as an in-vehicle infotainment system. The vehicle head unit may include a user interface, such as a display, for presenting information regarding the vehicle and/or various subsystems of the vehicle. The user interface of the head unit may also be configured to receive input from a user. As such, the user interface may include various hard and/or soft keys. The user interface may include a touchscreen display for receiving user input. The head unit may be configured to interact with a mobile device that is in proximity to the head unit, such as by being brought into the passenger compartment of the vehicle. In this regard, a user of a mobile device, such as a mobile telephone, a portable digital assistant (PDA), a music player or the like, may enter a vehicle having a head unit so as to be brought into proximity to the head unit. The mobile device may provide the head unit with information regarding the user interface of the mobile device and the head unit may, in turn, present at least a portion of the user interface of the mobile device upon the display of the head unit. Thus, the display of the head unit may include a portion of the user interface of the mobile device as well as at least a portion of the user interface of the head unit itself. Thus, a user may reference the display of the head unit in order to obtain information from at least portions of the user interfaces of the mobile device and the head unit.

The user may provide input to the mobile device and the head unit via the respective portions of the user interfaces of the mobile device and the head unit that are displayed by the head unit. In this regard, in an instance in which the head unit determines that the user has provided input via the portion of the display that is dedicated to the user interface of the mobile device, the head unit may provide the mobile device with information regarding the input such that the mobile device may respond appropriately. Conversely, in an instance in which the head unit determines that the user has provided input via the portion of the display that is dedicated to the user interface of the head unit, the head unit may respond to the user input.

Because the display of the head unit is divided so as to display at least a portion of the user interface of the mobile device and at least a portion of the user interface of the head unit, the size of the portions of the display dedicated to the user interface of the mobile device and the user interface head unit may be smaller than those with which the user is accustomed to interacting. As such, the user may have difficulties in some instances in interacting with the display so as to receive information from and/or provide information to the mobile device and/or head unit.

BRIEF SUMMARY

A method, apparatus and computer program product are therefore provided according to an example embodiment in order to facilitate user interaction with a display that is capable of presenting at least portions of the user interfaces of two or more devices. In this regard, a method, apparatus and computer program product of an example embodiment are provided in order to recognize gestures provided via the display and to interpret the gestures as providing input to a respective one of the devices. As such, a user may provide gesture input via a display that is capable of presenting at least portions of the user interfaces of two or more devices in an efficient and user-friendly manner in accordance with an example embodiment of the present invention.

In one embodiment, a method is provided that includes, in an instance in which a plurality of devices interact such that at least portions of the respective user interfaces of the devices are capable of being presented upon a display, receiving an identification of one or more valid gestures of at least a first device of the plurality of devices, such as by receiving the identification of one or more valid gestures from each of the plurality of devices. The method also includes receiving information indicative of a gesture provided via the display and determining, with a processor, whether the gesture is a valid gesture of a respective one of the plurality of devices. Based upon a determination of whether the gesture is a valid gesture, the method also includes causing an indication of the gesture to be provided to the first device.

In an embodiment in which a second one of the plurality of devices includes the display, the method determines whether the gesture is a valid gesture by determining whether the gesture is a valid gesture of the first device and, if so, causes the indication of the gesture to be provided to the first device. In this embodiment, the method may also cause execution of an event associated with gesture in an instance in which the gesture is not a valid gesture of the first device. In another embodiment in which the first device includes the display, the method determines whether the gesture is a valid gesture by determining whether the gesture is a valid gesture of the first device, and, if so, causes the indication of the gesture to be provided to the first device. In this embodiment, the method may also cause execution of an event associated with gesture in an instance in which the gesture is not a valid gesture of the first device.

In an embodiment in which a second one of the plurality of devices includes the display, the method determines whether the gesture is a valid gesture by determining whether the gesture is a valid gesture of the second device, and, if not, causes the indication of the gesture to be provided to the first device. In this embodiment, the method may also include causing execution of an event associated with gesture in an instance in which the gesture is a valid gesture of the second device.

In another embodiment, an apparatus is provided that includes at least one processor and at least one memory including computer program code with the at least one memory and the computer program code being configured to, with the at least one processor, cause the apparatus at least to receive, in an instance in which a plurality of devices interact such that at least portions of the respective user interfaces of the devices are capable of being presented upon a display, an identification of one or more valid gestures of at least a first device of the plurality of devices, such as by receiving the identification of one or more valid gestures from each of the plurality of devices. The at least one memory and the computer program code are also configured to, with the at least one processor, cause the apparatus to receive information indicative of a gesture provided via the display and to determine whether the gesture is a valid gesture of a respective one of the plurality of devices. The at least one memory and the computer program code are further configured to, with the at least one processor, cause the apparatus to cause, based upon a determination of whether the gesture is a valid gesture, an indication of the gesture to be provided to the first device.

In one embodiment in which a second one of the plurality of devices includes the display, the at least one memory and the computer program code are also configured to, with the at least one processor, cause the apparatus to determine whether the gesture is a valid gesture by determining whether the gesture is a valid gesture of the first device, and, if so, to cause the indication of the gesture to be provided to the first device. In this embodiment, the at least one memory and the computer program code may be further configured to, with the at least one processor, cause the apparatus to cause execution of an event associated with the gesture in an instance in which the gesture is not a valid gesture of the first device. In another embodiment in which the first device includes the display, the at least one memory and the computer program code are also configured to, with the at least one processor, cause the apparatus to determine whether the gesture is a valid gesture by determining whether the gesture is a valid gesture of the first device, and, if so, to cause the indication of the gesture to be provided to the first device. In this embodiment, the at least one memory and the computer program code may be further configured to, with the at least one processor, cause the apparatus to cause execution of an event associated with gesture in an instance in which the gesture is not a valid gesture of the first device.

In an embodiment in which a second one of the plurality of devices includes the display, the at least one memory and the computer program code may be configured to, with the at least one processor, cause the apparatus to determine whether the gesture is a valid gesture by determining whether the gesture is a valid gesture of the second device, and, if not, to cause the indication of the gesture to be provided to the first device. In this embodiment, the at least one memory and the computer program code may be further configured to, with the at least one processor, cause the apparatus to cause execution of an event associated with gesture in an instance in which the gesture is a valid gesture of the second device.

In a further embodiment, a computer program product is provided that includes at least one computer-readable storage medium having computer-executable program code portions stored therein with the computer-executable program code portions including program instructions configured to receive, in an instance in which a plurality of devices interact such that at least portions of the respective user interfaces are capable of being presented upon a display, an identification of one or more valid gestures of at least a first device of the plurality of devices. The computer-executable program code portions may also include program instructions configured to receive information indicative of a gesture provided via the display and to determine whether the gesture is a valid gesture of a respective one of the plurality of devices. The computer-executable program code portions may further include program instructions configured to cause, based upon a determination of whether the gesture is a valid gesture, an indication of the gesture to be provided to the first device.

In an embodiment in which a second one of the plurality of devices includes the display, the program instructions configured to determine whether the gesture is a valid gesture include program instructions configured to determine whether the gesture is a valid gesture of the first device, and, if so, to cause the indication of the gesture to be provided to the first device. In another embodiment in which the first device includes the display, the program instructions configured to determine whether the gesture is a valid gesture include program instructions configured to determine whether the gesture is a valid gesture of the first device, and, if so, to cause the indication of the gesture to be provided to the first device. In a further embodiment in which a second one of the plurality of devices includes the display, the program instructions configured to determine whether the gesture is a valid gesture include program instructions configured to determine whether the gesture is a valid gesture of the second device, and, if not, to cause the indication of the gesture to be provided to the first device.

In yet another embodiment, an apparatus is provided that includes, in an instance in which a plurality of devices interact such that at least portions of respective user interfaces of the devices are capable of being presented in an aggregated manner upon a display, means for receiving an identification of one or more valid gestures of at least a first device of the plurality of devices. The apparatus may also include means for receiving information indicative of a gesture provided via the display and means for determining whether the gesture is a valid gesture of a respective one of the plurality of devices. Based upon a determination of whether the gesture is a valid gesture, the apparatus may also include means for causing an indication of the gesture to be provided to the first device.

BRIEF DESCRIPTION OF THE DRAWINGS

Figure 1:
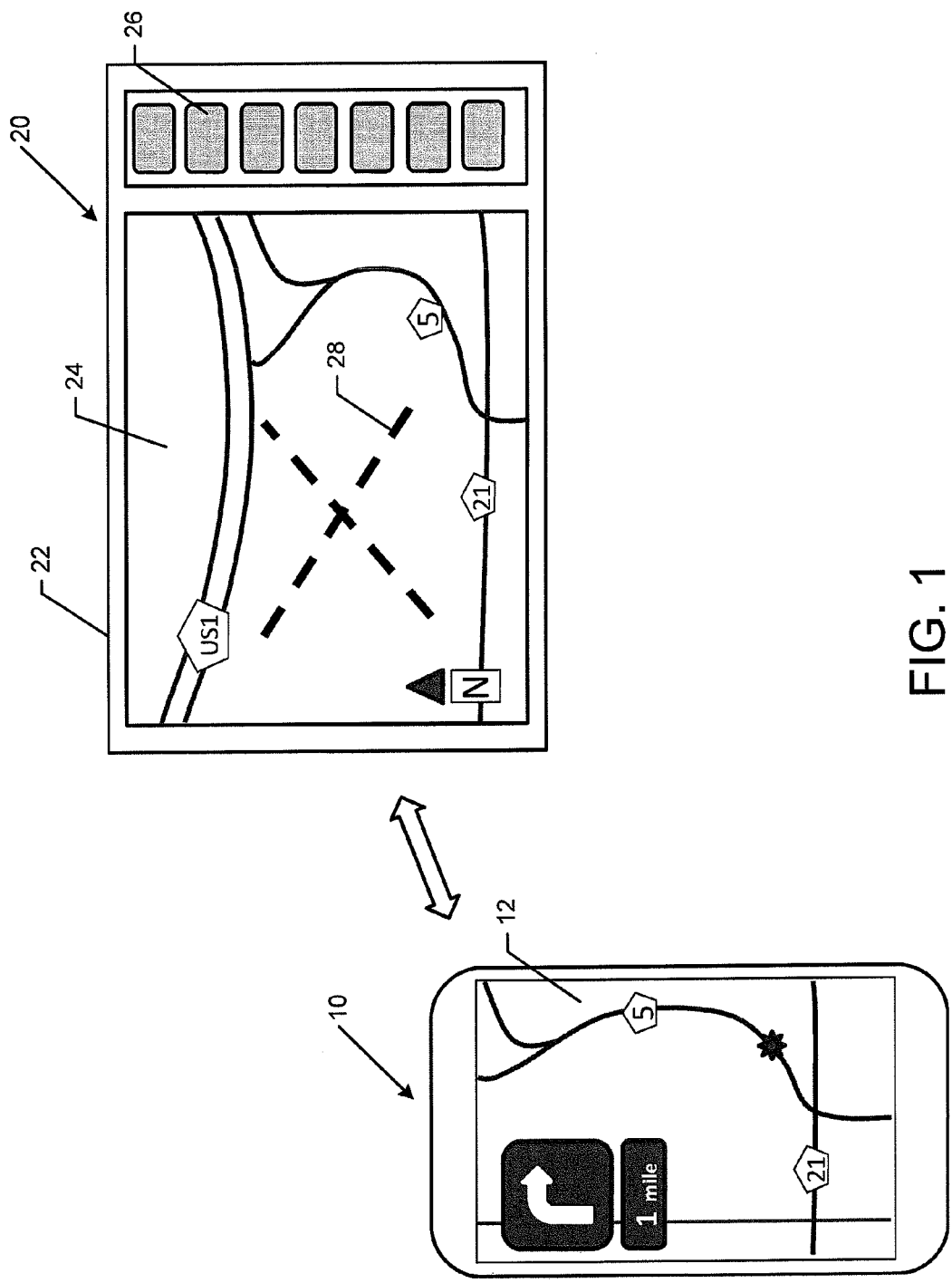
Figure 2:
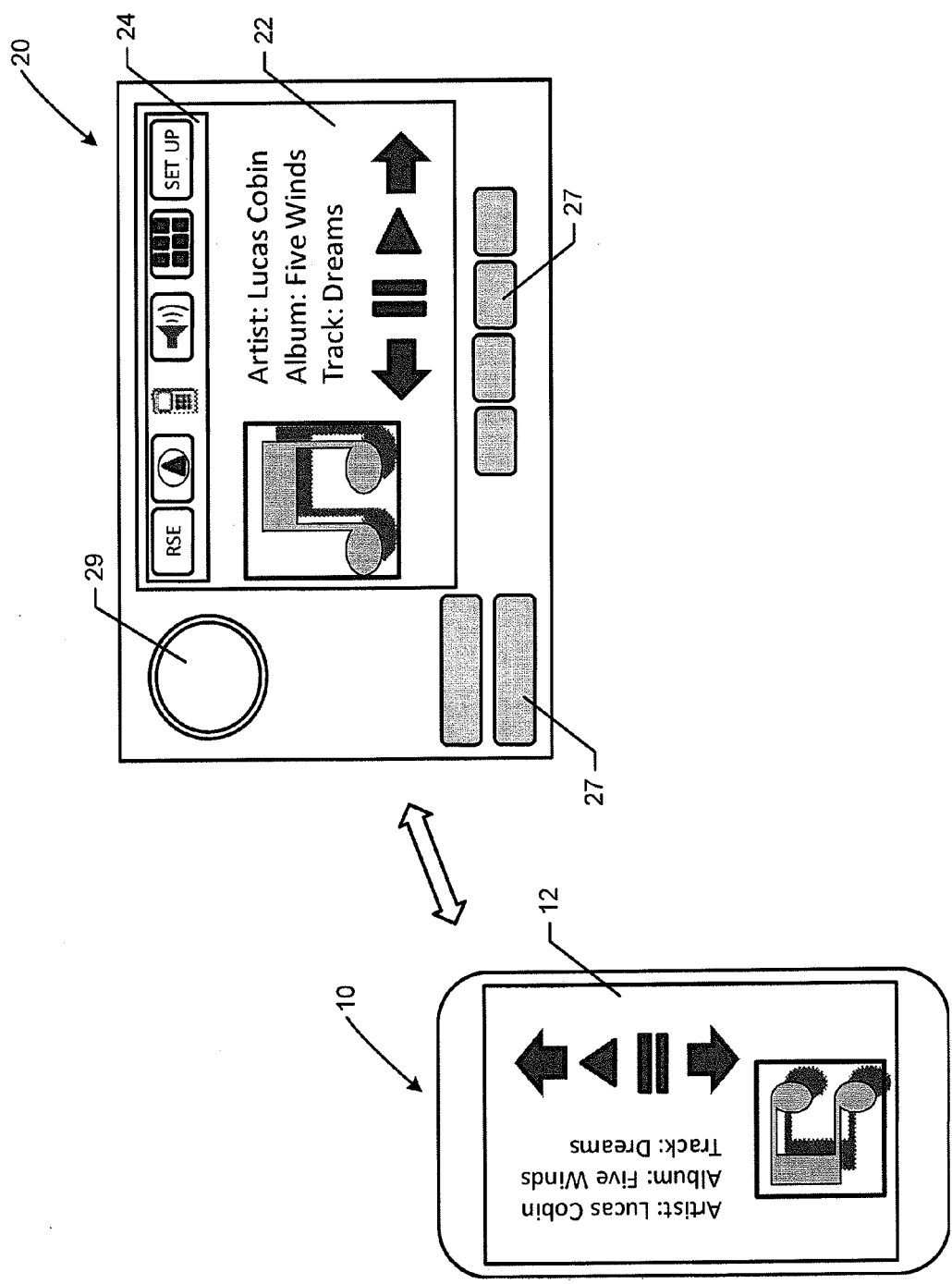
Figure 3:
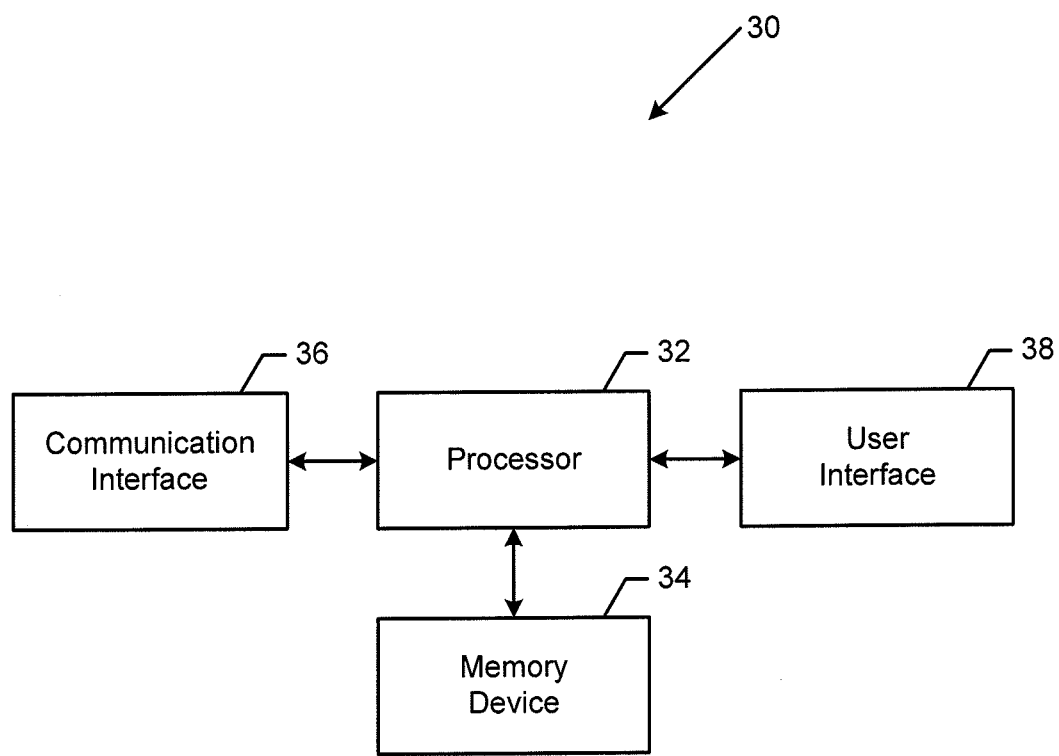
Figure 4:
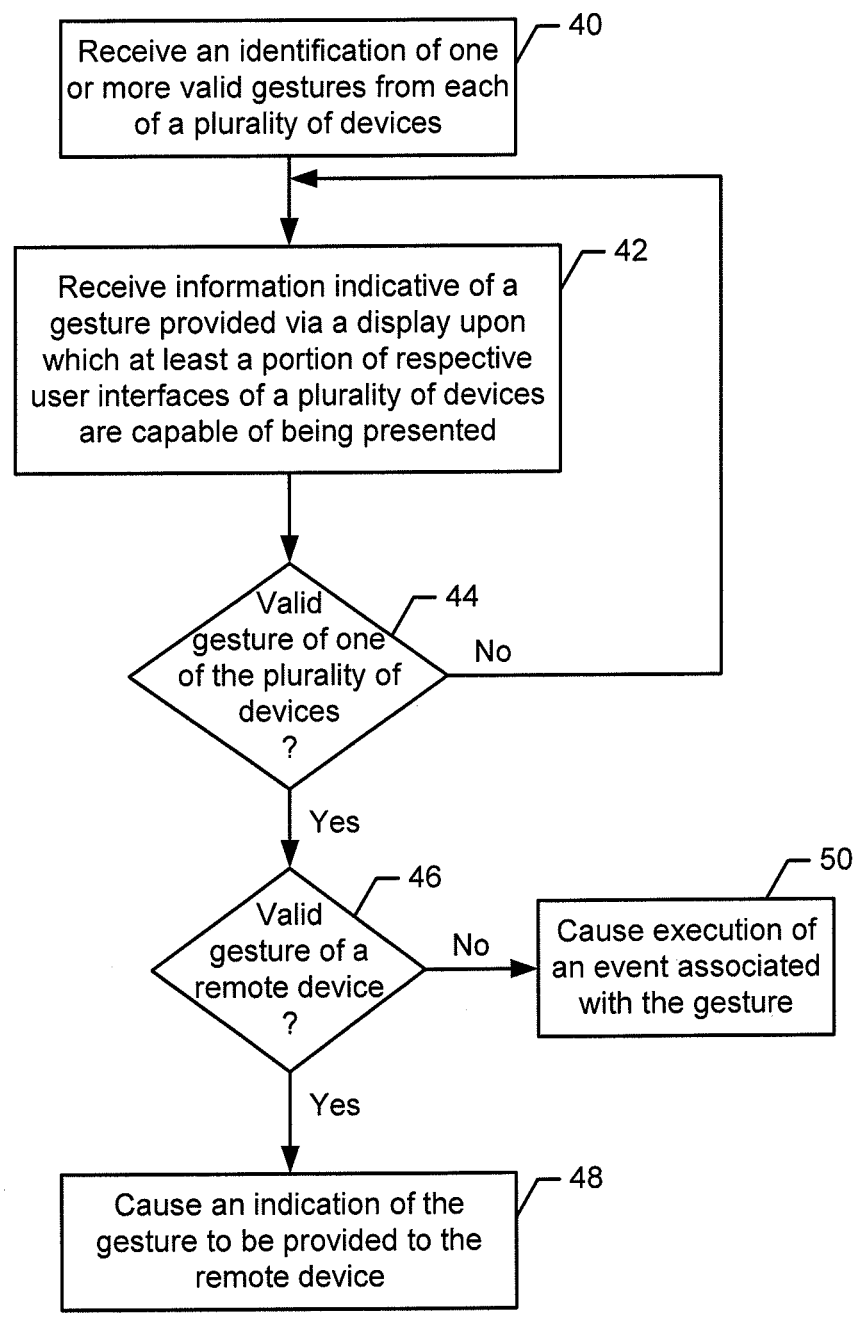
Figure 5:
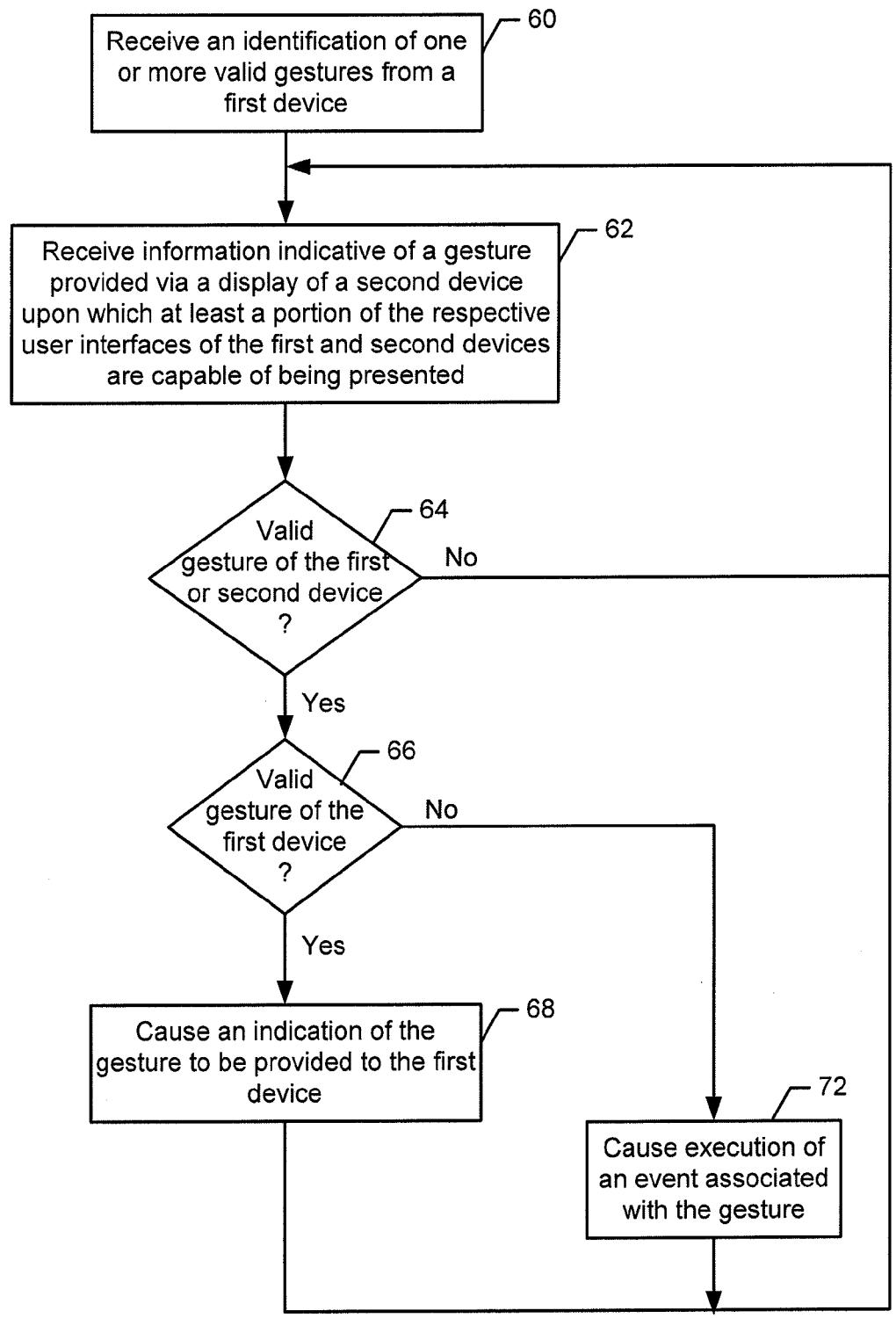
Figure 6:
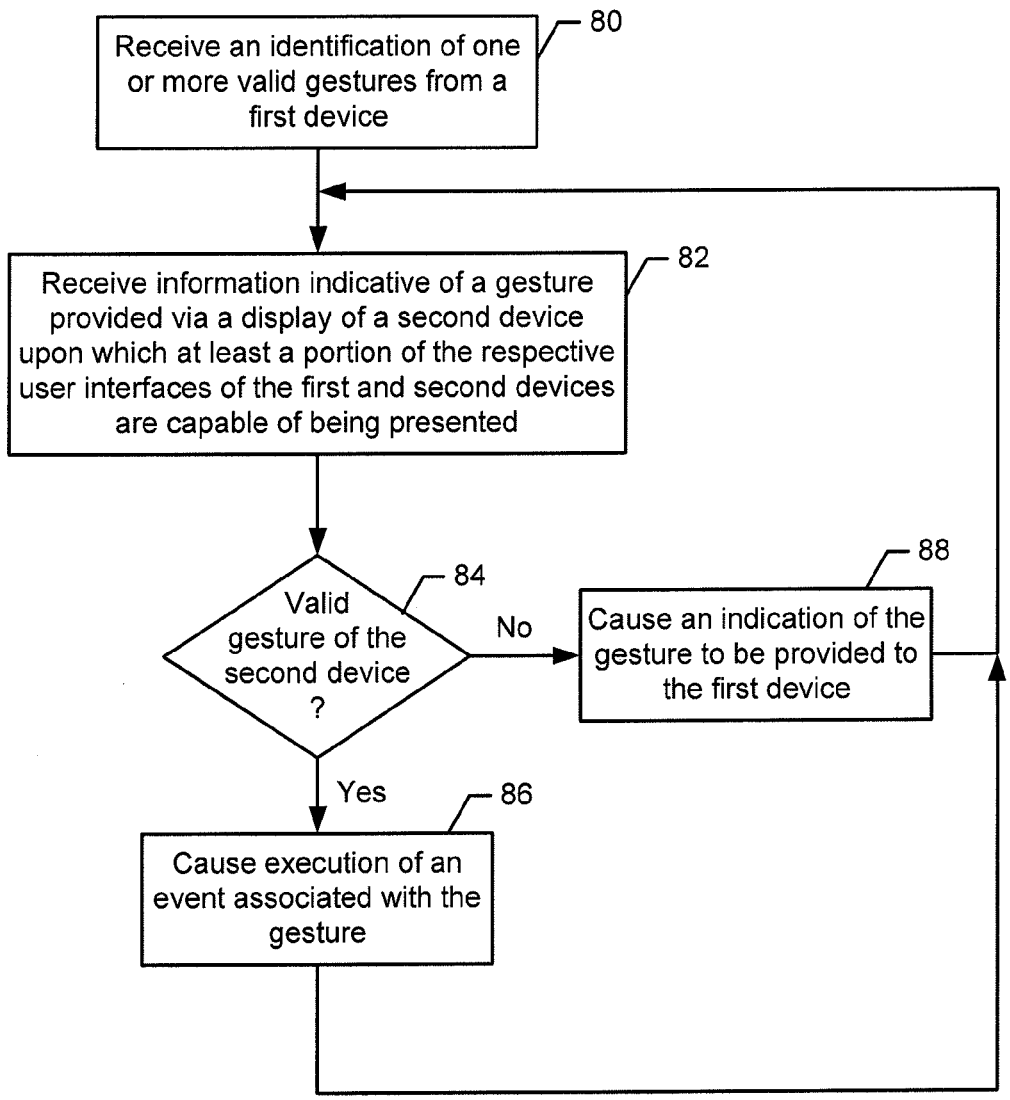

Having thus described certain example embodiments of the present invention in general terms, reference will hereinafter be made to the accompanying drawings, which are not necessarily drawn to scale, and wherein:

FIG. 1 is a schematic representation of a mobile terminal and a display of a head unit that includes at least portions of the user interfaces of the mobile terminal and the head unit and that is configured to receive and interpret gestures in accordance with an example embodiment of the present invention;

FIG. 2 is a schematic representation of a mobile terminal and a display of a head unit that includes at least portions of the user interfaces of the mobile terminal and the head unit and that is configured to receive and interpret gestures in accordance with another example embodiment of the present invention;

FIG. 3 is a block diagram of an apparatus that may be configured in accordance with an example embodiment of the present invention;

FIG. 4 is a flow chart illustrating the operations performed in accordance with an example embodiment to the present invention;

FIG. 5 is a flowchart illustrating the operations performed in accordance with another example embodiment of the present invention; and FIG. 6 is a flowchart illustrating the operations performed in accordance with a further example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to permit multiple devices to interact such that at least portions of the user interfaces of the devices may be presented upon a single display, such as the display of one of the devices. In this regard, the user interfaces may be presented concurrently or the user interfaces may be presented separate from one another. The method, apparatus and computer program product of an example embodiment may permit a wide variety of devices to interact. By way of example, but not of limitation, the method, apparatus and computer program product of an example embodiment will be described below in conjunction with the interaction of a first device, such as a mobile terminal with a second device, such as the head unit of a vehicle, e.g., an in-vehicle infotainment system. In this regard, a wide variety of mobile terminals may interact with the vehicle head unit including, for example, PDAs, pagers, mobile televisions, mobile telephones, gaming devices, laptop computers, cameras, camera phones, video recorders, audio/video players, radios, global positioning system (GPS) devices, navigation devices, or any combination of the aforementioned, and other types of voice and text communications systems. While two devices will be hereinafter described to interact in accordance with an example embodiment, three or more devices may similarly interact in accordance with other embodiments.

By way of example, FIG. 1 illustrates the interaction of a mobile terminal 10 with a vehicle head unit 20. As shown, the mobile terminal and the vehicle head unit may communicate via a wireless communication link, such as via any of various wireless communications techniques including, for example, Bluetooth, Wi Fi or other short range communications techniques. Alternatively, the mobile terminal and the vehicle head unit may communicate utilizing wireline communications techniques. For example, the mobile terminal may be placed or seated within a docking station that establishes wireline communications between the mobile terminal and the vehicle head unit.

The interaction between mobile terminal 10 and the vehicle head unit 20 may commence in various manners. For example, one or both of the mobile terminal and vehicle head unit may detect the other device once the mobile terminal and the vehicle head unit are in proximity to one another, such as in instances in which the mobile terminal is disposed within the passenger compartment of the vehicle. In these instances, the mobile terminal and vehicle head unit may automatically establish communications therebetween. In other embodiments, a user may manually commence interaction between the mobile terminal and the vehicle head unit, such as by selection of the terminal mode of operation for the mobile terminal.

Following the establishment of interaction between the mobile terminal 10 and the vehicle head unit 20 in accordance with one embodiment, at least a portion of the user interface 12 of the mobile terminal, such as at least a portion of the information presented upon the display of the mobile terminal, may be presented upon the display 22 of the vehicle head unit. In the illustrated embodiment, at least a portion of the user interface of the vehicle head unit also continues to be presented upon the display of the vehicle head unit such that the display concurrently presents at least portions of the user interfaces of both the mobile terminal and the vehicle head unit. In this regard, the mobile terminal may be executing a navigation or mapping application such that the user interface of the mobile terminal presents at least a portion of a map. As a result of the interaction between the mobile terminal and the vehicle head unit, the display of the vehicle head unit of this embodiment presents at least a portion of the user interface of the mobile terminal, e.g., at least a portion of the map, within a first region 24 of the display. Although the embodiment of FIG. 1 illustrates both the mobile terminal and the display of the vehicle head unit presenting a portion of the map, the display of the mobile terminal may optionally be cleared or deactivated once at least a portion of the user interface of the mobile terminal is presented upon the display of the vehicle head unit since the user is expected to reference the display of the vehicle head unit instead of the display of the mobile terminal.

Referring again to the embodiment of FIG. 1, the display 22 of the vehicle head unit 20, such as a touch screen as described below, also presents at least a portion of the user interface of the vehicle head unit in a second region 26 of the display, such as represented by a number of buttons that are configured to receive user input. In this regard, the portion of the user interface of the vehicle head unit that is presented within the second region may be the same user interface that is presented by the display in the absence of interaction with the mobile terminal 10 or may be a subset, that is, only a portion, of the user interface that is otherwise presented in the absence of interaction with the mobile terminal with the subset of the user interface being predefined, for example, by the vehicle head unit and/or the user of the vehicle head unit.

By interacting with the information presented upon the display 22, the user may view information provided both by the mobile terminal 10 and the vehicle head unit 20, either concurrently as shown in FIG. 1 or separately as described below. In addition, a user may provide input to both the mobile terminal and the vehicle head unit. In an instance in which the user provides input to the mobile terminal via the display, the vehicle head unit may cause information regarding the input provided by the user to be provided to the mobile terminal such that the mobile terminal may take appropriate action in response to the user input, such as in the same or a similar fashion as if the user had provided the same input to the mobile terminal itself.

By way of another example, FIG. 2 illustrates the interaction of a mobile terminal 10 in which information regarding a song or other content that may be presented by the mobile terminal is provided to the vehicle head unit 20 and is presented, at least partially, upon the display 22 of the vehicle head unit. In this embodiment, the display of the vehicle head unit includes a first region 24 in which at least a portion of the user interface of the mobile terminal is presented, such as by providing information regarding a particular track and providing buttons or other icons that may be actuated by a user in order to provide input to the mobile terminal. As described above in conjunction with the example embodiment of FIG. 1, the display of the vehicle head unit of this embodiment may also include a second region 26 in which at least a portion of the user interface of the vehicle head unit is presented, such as in the form of buttons that are also configured to receive user input to the vehicle head unit. Further, the vehicle head unit may optionally include hard and/or soft keys 27 as well as dials 29 and other input devices for receiving user input.

The user may therefore receive information that is presented upon the display 22 of a vehicle head unit 20 that originates either with the mobile terminal 10 and/or the vehicle head unit. In addition, the user may provide input to either the mobile terminal or the vehicle head unit via the display of the vehicle head unit. In this regard, input provided by the user that is intended for the mobile terminal may be recognized and information relating to the user input may, in turn, be provided to the mobile terminal. As such, the mobile terminal may take the appropriate action in response to user input. Additionally, input provided by the user that is intended for the vehicle head unit may be recognized such that the vehicle head unit may respond appropriately to the user input.

Although described above in conjunction with embodiments in which at least portions of the user interfaces of the plurality of devices are displayed concurrently, the method, apparatus 30 and computer program product of other embodiments permit the plurality of devices to interact such that the respective user interfaces of the devices are capable of being presented upon the display. The presentation of the respective user interfaces need not be concurrent, however, but the respective user interfaces may be presented separately, such as sequentially or serially, in other embodiments. In this regard, the user interface of the one of the devices may be presented in the foreground so as to be visible to a user with the user interface(s) of the other devices being in the background and, therefore, not perceptible to the user. The user interface that is presented in the foreground and the user interface(s) that are in the background may change, such as in response to user input, context or the like. In another embodiment, the user interface of a first device may be presented in a fulsome manner with the user interface(s) of the other devices being represented by an icon, a thumbnail or the like that is presented concurrent with the user interface of the first device.

An apparatus 30 that may be configured in accordance with an example embodiment of the present invention may be embodied by or associated with any of a number of different devices including, for example, any one or more of the devices that are interacting, such as the mobile terminal 10 or the vehicle head unit 20, or by another device that is in communication with the devices that are interacting. Regardless of the manner in which the apparatus is embodied, the apparatus 30 may generally be configured as shown, for example, in FIG. 3. In this embodiment, the apparatus may include or otherwise be in communication with a processor 32, a memory device 34, a communications interface 36 and a user interface 38. In some embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 30 may, in some embodiments, be a mobile terminal 10 or the vehicle head unit 20 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 10 or vehicle head unit 20) adapted for employing an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 36 may be any means such as a device or circuitry embodied in either hardware, software, or a combination of hardware and software that is configured to receive and/or transmit data from/to the devices that are interacting, such as the mobile terminal 10 and the vehicle head unit 20. In this regard, the communication interface may include, for example, an antenna (or multiple antennas) and supporting hardware and/or software for enabling communications with a wireless communication network. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The user interface 38 may be in communication with the processor 32 to receive an indication of a user input at the user interface and/or to provide information, such as an audible, visual, mechanical or other output, to the user. As such, the user interface may include, for example, a display, e.g., a touch screen, as described above or other input/output mechanisms. In one embodiment, however, the apparatus does not include a user interface, but, instead, communicates and interacts with the user interface of another device, such as the display, e.g. touchscreen, of one of the devices that is interacting. However, in an embodiment in which the apparatus is embodied as one of the devices that is interacting, such as a mobile terminal 10 or a vehicle head unit 20, the user interface may include, among other devices or elements, any or all of a speaker, a microphone, a display, e.g., a touchscreen, a keyboard or the like. In this regard, for example, the processor may comprise user interface circuitry configured to control at least some functions of one or more elements of the user interface, such as, for example, the display. The processor and/or user interface circuitry comprising the processor may be configured to control one or more functions of one or more elements of the user interface through computer program instructions (e.g., software and/or firmware) stored on a memory accessible to the processor (e.g., memory device 24 and/or the like).

Referring now to FIG. 4, the operations of a method, apparatus 30 and computer program product of an example embodiment of the present invention are illustrated. In order to be responsive to gestures provided by a user and to appropriately interpret the gestures as being intended as input for a respective one of the devices that are interacting, such as a respective one of a mobile terminal 10 or a vehicle head unit 20, the apparatus may include means, such as the processor 32, the communication interface 36 or the like, for receiving an identification of the valid gestures for each of the plurality of devices that are configured to interact. See operation 40 of FIG. 4. In one embodiment, a valid gesture is a gesture that is to be recognized and responded to by a respective device. In one embodiment, a gesture may include a device identification portion that identifies the device with which gesture is associated and for which the gesture is valid and a gesture portion that provides the gesture input. In one embodiment in which the apparatus is embodied by or otherwise associated with one of the devices that are to interact, such as either the mobile terminal or the vehicle head unit, the apparatus, such as the processor, the communications interface or the like, may receive an identification of the valid gestures from the other device(s), while the memory device 35 may store information regarding the valid gestures of the device that embodies or is otherwise associated with the apparatus.

The identification of the valid gestures may be provided in various manners. In one embodiment, for example, the identification of the valid gestures may be provided in the form of a white list. In addition to the identification of the valid gestures, the apparatus 30, such as the processor 32, the communication interface 36 or the like, may also receive an identification of one or more gestures that are invalid for a respective device, such as in the form of a black list. The identification of the valid gestures may, in one embodiment, identify the valid gestures by name or another identifier. However, in an instance in which the identification of the valid gestures is not predetermined or standardized, the identification of the valid gestures may alternatively be provided in the form of a description of the valid gestures, such as a description of a sequence of input touch events.

In an instance in which the valid gestures of each device are different than the valid gestures of the other devices that will interact in accordance with an example embodiment of the present invention such that there is no valid gesture in common between any two of the devices, the apparatus 30, such as the processor 32, the communication interface 36 or the like, may receive an identification of the valid gestures for each of the devices and may, in one embodiment, cause the identification of the valid gestures of each of the devices to be stored, such as in the memory device 34. In the embodiment in which a gesture includes a device identification portion and a gesture portion, a plurality of devices may include valid gestures having the same gesture portion so long as the device identification portions of the gestures identify and distinguish between the devices. In other embodiments in which one or more of the valid gestures of at least two of the devices are in common, that is, two or more of the devices identify the same valid gesture, the apparatus, such as the processor, the communications interface or the like, may communicate with at least one of the devices that identified the gesture that is in common in order to redefine the valid gestures associated with the devices in such a manner that each valid gesture is associated with only one of the devices and not two or more of the devices. Further details regarding the reconciliation of the gestures may be provided by U.S. patent application Ser. No. 12/713,780 entitled "Method and Apparatus for Providing Cooperative Enablement of User Input Options" filed Feb. 26, 2010, the contents of which are incorporated herein. In this embodiment, following reconciliation of the gestures such that each gesture is only valid for only a single device, the apparatus, such as the processor, may cause an identification of the valid gestures of each of the devices to be stored, such as in the memory device.

Thereafter, the apparatus 30, such as the processor 32, the user interface 38 or the like, may cause the at least a portion of one or more of the user interfaces of the plurality of devices that are interacting, such as the mobile terminal 10 and the vehicle head unit 20, to be presented upon a display 22, such as the display of one of the devices, e.g., a display of the vehicle head unit. See, for example, FIGS. 1 and 2. As described above, the user interfaces of the plurality of devices that are interacting may be presented concurrently or separately. While at least a portion of one or more user interfaces of the plurality of devices are presented upon the display, the apparatus may also include means, such as the processor, the user interface or the like, for receiving information indicative of a gesture provided via the display, e.g., a touchscreen, upon which at least a portion of one or more user interfaces of the plurality of devices are presented. See operation 42 of FIG. 4. In one embodiment in which portions of the user interfaces of first and second devices are concurrently presented upon the display, the gesture may be provided by the user within the region 24 of the display that presents at least the portion of the user interface of a first device, such as the mobile terminal, as shown by the X-shaped gesture 28 in FIG. 1. Alternatively, the gesture may be provided by the user in the region 26 of the display that is presenting at least a portion of the user interface of a second device, such as the vehicle head unit. Still further, the gesture may be provided by a user in such a manner as to bridge between those regions of the display that are presenting at least portions of the user interfaces of the devices such that a portion of the gesture is in each of the regions. Regardless of the relative position of the gesture provided by the user with respect to the regions of the display within which at least portions of the user interfaces of the plurality of devices are presented, the apparatus, such as the processor, may be configured to recognize the gesture and interpret the gesture as a valid gesture of a respective one of the devices.

The user interface of a device need not be presented in order for the apparatus 30, such as the processor 32, to recognize the gesture as a valid gesture of the respective device. In this regard, the user interface of a first device may be presented in the foreground of a display 22 and the user interface of a second device may be in the background. In response to a gesture provided by the user via the display, e.g., a touchscreen, the apparatus, such as the processor, may recognize the gesture and interpret the gesture as a valid gesture of the second device, even though the user interface of the second device is in the background and not currently visible. In a further embodiment in which the user interface of a first device is presented upon the display in a fulsome manner and the user interface of a second device is represented by an icon, thumbnail or the like upon the display, the apparatus, such as the processor, may recognize a gesture and interpret the gesture as a valid gesture of the second device, even though the user interface of the second device is not fully presented and is, instead, represented by an icon, thumbnail or the like.

In this regard, the apparatus 30 may include means, such as the processor 32 or the like, for determining whether the gesture is a valid gesture of one of the devices that is interacting. See operation 44 of FIG. 4. In this regard, the apparatus, such as the processor, may compare the information that is received regarding the gesture to the definition of each of the valid gestures of each of the devices that are interacting in accordance with an example embodiment of the present invention. In an instance in which the apparatus, such as the processor, does not identify the gesture as a valid gesture of any of the devices, the apparatus, such as the processor, may await further input from the user in operation 42 before again considering whether a valid gesture has been received.

Alternatively, in instances in which the apparatus 30, such as the processor 32, determines that a valid gesture has been received, the apparatus may include means, such as a processor or the like, for determining whether the gesture is a valid gesture of a remote device, that is, a device other than the device that embodies or is otherwise associated with the apparatus that is processing the gesture input. See operation 46 of FIG. 4. For example, in an instance in which the apparatus that receives and identifies the gesture is embodied by or otherwise associated with a vehicle head unit 20, the apparatus, such as a processor, may determine whether the gesture that has been received is a valid gesture of a mobile terminal 10 that is remote from but interacting with the vehicle head unit.

In an instance in which the apparatus 30, such as a processor 32, determines that the gesture is a valid gesture of a remote device, the apparatus may include means, such as a processor, the communications interface 36 or the like, for causing information regarding the gesture to be provided to the remote device such that the remote device may, in turn, respond or otherwise take action in an appropriate manner in response to the gesture input. See operation 48 of FIG. 4. Alternatively, in an instance in which it is determined that the gesture is not a valid gesture of a remote device, the apparatus may include means, such as a processor or the like, for causing an event that is triggered by the gesture to be performed. See operation 50 of FIG. 4. In regards to the example embodiment of FIG. 1, the X-shaped gesture 28 may be a valid gesture for the vehicle head unit 20 and may be associated with the deactivation of the display 22 of the vehicle head unit such that the identification and interpretation of the gesture input causes the display of the vehicle head unit to be deactivated, even though the X-shaped gesture input was provided within the region 24 of the display within which at least a portion of the user interface of the mobile terminal 10 is presented.

In order to provide further explanation, the operations associated with the method, apparatus 30 and computer program product of another example embodiment are described below in conjunction with FIG. 5. In this embodiment in which an apparatus which may be embodied by or associated with a second device that is interacting with a first device, that is, a device remote from but in communication with the second device, in such a manner that at least portions of the user interfaces of the first and second devices are capable of being presented upon a display of the second device, the apparatus may include means, such as the processor 32, the communication interface 36 or the like, for receiving an identification of one or more valid gestures from the first device. See operation 60 of FIG. 5. As described above in conjunction with the embodiment of FIG. 4, the apparatus, such as a processor, may receive an identification of the valid gestures of the first device and may cause the identification of the valid gestures of the first and second devices to be stored, such as in the memory device 34. As also described above, in instances in which the same gestures are indicated to be valid by each of the first and second devices, the apparatus, such as a processor, may communicate with the devices in order to reconcile the gestures such that each valid gesture is only associated with a single device.

Thereafter, the apparatus 30, such as the processor 32, the user interface 38 or the like, may cause the at least a portion of one or more of the user interfaces of first and second devices that are interacting, such as the mobile terminal 10 and the vehicle head unit 20, to be presented upon a display 22, such as the display of one of the devices, e.g., a display of the vehicle head unit. See, for example, FIGS. 1 and 2. The apparatus of this embodiment may also include means, such as the processor, the user interface or the like, for receiving information indicative of a gesture provided via the display, e.g., a touchscreen, upon which at least a portion of one or more of the user interfaces of the first and second devices are presented. See operation 62 of FIG. 5. As described above in conjunction with FIG. 4, the apparatus, such as the processor, of one embodiment may be configured to recognize the gesture regardless of the relative position of the gesture provided by the user with respect to the regions of the display within which at least portions of the user interfaces of the first and second devices are presented and to interpret the gesture as a valid gesture of a respective one of the devices. Indeed, the apparatus, such as the processor, of one embodiment may be configured to recognize the gesture as being a valid gesture of a respective one of the devices that is interacting regardless of whether the user interface of the respective device is currently being presented upon the display, is in the background or is represented by an icon, a thumbnail or the like.

As shown in operation 64 of FIG. 5, the apparatus 30 of this embodiment may also include means, such as a processor 32 or the like, for determining whether the gesture is a valid gesture of a first or second device, such as described above in conjunction with operation 44. In an instance in which it is determined that the gesture is not a valid gesture of the first or second device, the apparatus, such as the processor, may continue to await information in operation 62 that is indicative of an additional gesture prior to again determining whether the gesture is valid. In an instance in which it is determined that the gesture is a valid gesture of one of the first device or the second device, the apparatus may include means, such as the processor or the like, for determining whether the gesture is a valid gesture of the first device. See operation 66 of FIG. 5. In an instance in which it is determined that the gesture is a valid gesture of the first device, the apparatus may include means, such as the processor, the communication interface 36 or the like, for causing information indicative of the gesture to be provided to the first device such that the first device may, in turn, perform the desired operation or otherwise respond to the gesture that was intended for the first device, such as in the same manner as if the user had provide the gesture directly to the first device. See operation 68 of FIG. 5. However, in an in instance in which it is determined that the gesture is not a valid gesture of the first device, the apparatus may include means, such as the processor or the like, for causing an event that is triggered by the gesture to be performed. See operation 72 of FIG. 5.

By way of further explanation, the operations performed by the method, apparatus 30 and computer program product of another example embodiment are illustrated in FIG. 6. In this embodiment in which an apparatus which may be embodied by or associated with a second device that is interacting with a first device, that is, a device remote from but in communication with the second device, in such a manner that at least portions of the user interfaces of the first and second devices are capable of being presented, e.g., concurrently, separately, etc., upon a display of the second device, the apparatus may include means, such as the processor 32, the communication interface 36 or the like, for receiving an identification of one or more valid gestures from the first device. See operation 80 of FIG. 6. As described above in conjunction with the embodiments of FIGS. 4 and 5, the apparatus, such as a processor, may receive an identification of the valid gestures of the first device and may cause the identification of the valid gestures of the first and second devices to be stored, such as in the memory device 34. As also described above, in instances in which the same gestures are indicated to be valid by each of the first and second devices, the apparatus, such as a processor, may communicate with the devices in order to reconcile the gestures such that each valid gesture is only associated with a single device.

Thereafter, the apparatus 30, such as the processor 32, the user interface 38 or the like, may cause the at least a portion of one or more of the user interfaces of the first and second devices that are interacting, such as the mobile terminal 10 and the vehicle head unit 20, to be presented upon a display 22, such as the display of one of the devices, e.g., a display of the vehicle head unit. See, for example, FIGS. 1 and 2. The apparatus of this embodiment may also include means, such as the processor, the user interface or the like, for receiving information indicative of a gesture provided via the display, e.g., a touchscreen, upon which at least a portion of one or more of the user interfaces of the first and second devices are presented. See operation 82 of FIG. 6.

As shown in operation 84 of FIG. 6, the apparatus 30 of this embodiment may also include means, such as a processor 32 or the like, for determining whether the gesture is a valid gesture of the second device. In an instance in which it is determined that the gesture is a valid gesture of the second device, the apparatus may include means, such as the processor or the like, for causing an event that is triggered by the gesture to be performed. See operation 86 of FIG. 6. However, in an instance in which the gesture is determined not to be a valid gesture of the second device, the apparatus may include means, such as the processor, the communications interface 36 or the like, for causing information indicative of the gesture to be provided to the first device. In this instance, the first device may, in turn, analyze the information indicative of the gesture and may determine whether the gesture is a valid gesture of the first device. If the gesture is a valid gesture of the first device, the first device may perform the desired operation or otherwise respond to the gesture, such as in the same manner as if the user had provide the gesture directly to the first device. Alternatively, if the first device determines that the gesture is not a valid gesture of the first device, the information regarding the gesture may be discarded or otherwise not acted upon. In one embodiment, however, the first device may provide the apparatus embodied by or associated with the second device with an indication that the gesture is not a valid gesture of the first device such that the apparatus may continue to await additional gesture input in operation 82.

The method, apparatus 30 and computer program product of an example embodiment of the present invention may therefore recognize gestures that are provided by a user via display upon which at least a portion of one or more user interfaces of two or more devices are capable of being presented. A method, apparatus and computer program product may determine whether the gesture is a valid gesture and, in an instance in which the gesture is a valid gesture, may determine the device to which the user is intending to provide input regardless of whether the user interface of the respective device is currently presented upon the display and, in an embodiment in which portions of each of the user interfaces are concurrently presented upon the display, regardless of the position of the gesture relative to the regions of the display within which the portions of the user interfaces of the devices are presented. Thus, the method, apparatus and computer program product of an example embodiment may cause the various devices to respond appropriately to the gesture input provided by the user, while permitting the user to provide the gesture input in a manner that is simpler and less constrained by permitting the user to introduce the gesture input at any location upon the display regardless the user interface(s) that are currently being presented upon the display and/or the location of the user interface(s) upon the display.

FIGS. 4-6 are flowcharts of a method and program product according to an example embodiment of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 34 of an apparatus 30 and executed by a processor 32 of the apparatus. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts blocks. These computer program instructions may also be stored in a computer-readable memory that may direct a computer or other programmable apparatus to function in a particular manner, such that the instructions stored in the computer-readable memory produce an article of manufacture which implements the functions specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   causing interaction of a plurality of devices, comprising at least a first device and a second device, wherein interaction comprises: causing display of a first user interface currently being displayed upon a first display of the first device upon a second display of the second device; and concurrently, causing display of at least a portion of information configured to be presented upon the second display of the second device on the second display of the second device, wherein the display of the user interface currently being displayed upon the first display and the information configured to be presented upon the second display is concurrently presented upon a single display, the single display being the second display;
   receiving an identification of one or more valid gestures of at least the first device of the plurality of devices;
   while concurrently causing display, on the second display, of both (i) the user interface currently being displayed upon the first display and (ii) the information configured to be presented upon the second display, receiving, via the second display, information indicative of a sequence of input touch events introduced at least partially at a location on the second display presenting the user interface of the first device,
   wherein the sequence of input touch events comprises a device identification portion and a gesture portion, the device identification portion identifying with which respective device of the plurality of devices the at least one of the one or more valid gestures is associated, the gesture portion providing a gesture input, the gesture input causing one of a plurality of events capable of being performed to be performed, wherein a subset of the plurality of devices are associated with one or more valid gestures having a same gesture portion and a different device identification portion as other devices;
   determining, with a processor, whether the sequence of input touch events is identified as a valid gesture of the first device; and
   based upon a determination that the device identification portion of the gesture identifies the first device and the gesture portion is a valid gesture for the first device, causing an indication of the gesture to be provided to the first device.

2. A method according to claim 1 wherein receiving the identification of one or more valid gestures comprises receiving the identification of one or more valid gestures from each of the plurality of devices.

3. A method according to claim 1 wherein a second one of the plurality of devices comprises the display, wherein determining whether the gesture is a valid gesture comprises determining whether the gesture is a valid gesture of the first device, and wherein causing the indication of the gesture to be provided to the first device comprises causing the indication of the gesture to be provided to the first device in an instance in which the gesture is a valid gesture of the first device.

4. A method according to claim 3 further comprising causing execution of an event associated with gesture in an instance in which the gesture is not a valid gesture of the first device.

5. A method according to claim 1 wherein the first device comprises the display, wherein determining whether the gesture is a valid gesture comprises determining whether the gesture is a valid gesture of the first device, and wherein causing the indication of the gesture to be provided to the first device comprises causing the indication of the gesture to be provided to the first device in an instance in which the gesture is a valid gesture of the first device.

6. A method according to claim 5 further comprising causing execution of an event associated with the gesture in an instance in which the gesture is not a valid gesture of the first device.

7. A method according to claim 1 wherein a second one of the plurality of devices comprises the display, wherein determining whether the gesture is a valid gesture comprises determining whether the gesture is a valid gesture of the second device, and wherein causing the indication of the gesture to be provided to the first device comprises causing the indication of the gesture to be provided to the first device in an instance in which the gesture is not a valid gesture of the second device.

8. A method according to claim 7 further comprising causing execution of an event associated with the gesture in an instance in which the gesture is a valid gesture of the second device.

9. An apparatus comprising at least one processor and at least one memory including computer program code, the at least one memory and the computer program code configured to, with the at least one processor, cause the apparatus at least to:
cause interaction of a plurality of devices, comprising at least a first device and a second device, wherein interaction comprises: causing display of a first user interface currently being displayed upon a first display of the first device upon a second display of the second device and concurrently, causing display of at least a portion of information configured to be presented upon the second display of the second device on the second display of the second device, wherein the display of the user interface currently being displayed upon the first display and the information configured to be presented upon the second display is concurrently presented upon a single display, the single display being the second display,
receive an identification of one or more valid gestures of at least the first device of the plurality of devices;
while concurrently causing display, on the second display, of both (i) the user interface currently being displayed upon the first display and (ii) the information configured to be presented upon the second display, receiving, via the second display, information indicative of a sequence of input touch events introduced at least partially at a location on the second display presenting the user interface of the first device,
wherein the sequence of input touch events comprises a device identification portion and a gesture portion, the device identification portion identifying with which respective device of the plurality of devices the at least one of the one or more valid gestures is associated, the gesture portion providing a gesture input, the gesture input causing one of a plurality of events capable of being performed to be performed, wherein a subset of the plurality of devices are associated with one or more valid gestures having a same gesture portion and a different device identification portion as other devices;
determine whether the sequence of input touch events is identified as a valid gesture of the first device; and
based upon a determination that the device identification portion of the gesture identifies the first device and the gesture portion is a valid gesture for the first device, cause an indication of the gesture to be provided to the first device.

10. An apparatus according to claim 9 wherein the at least one memory and the computer program code are configured to, with the at least one processor, cause the apparatus to receive the identification of one or more valid gestures by receiving the identification of one or more valid gestures from each of the plurality of devices.

11. An apparatus according to claim 9 wherein a second one of the plurality of devices comprises the display, wherein the at least one memory and the computer program code are configured to, with the at least one processor, cause the apparatus to determine whether the gesture is a valid gesture by determining whether the gesture is a valid gesture of the first device, and wherein the at least one memory and the computer program code are configured to, with the at least one processor, cause the apparatus to cause the indication of the gesture to be provided to the first device by causing the indication of the gesture to be provided to the first device in an instance in which the gesture is a valid gesture of the first device.

12. An apparatus according to claim 11 wherein the at least one memory and the computer program code are further configured to, with the at least one processor, cause the apparatus to cause execution of an event associated with gesture in an instance in which the gesture is not a valid gesture of the first device.

13. An apparatus according to claim 9 wherein the first device comprises the display, wherein the at least one memory and the computer program code are configured to, with the at least one processor, cause the apparatus to determine whether the gesture is a valid gesture by determining whether the gesture is a valid gesture of the first device, and wherein the at least one memory and the computer program code are configured to, with the at least one processor, cause the apparatus to cause the indication of the gesture to be provided to the first device by causing the indication of the gesture to be provided to the first device in an instance in which the gesture is a valid gesture of the first device.

14. An apparatus according to claim 13 wherein the at least one memory and the computer program code are further configured to, with the at least one processor, cause the apparatus to cause execution of an event associated with the gesture in an instance in which the gesture is not a valid gesture of the first device.

15. An apparatus according to claim 9 wherein a second one of the plurality of devices comprises the display, wherein the at least one memory and the computer program code are configured to, with the at least one processor, cause the apparatus to determine whether the gesture is a valid gesture by determining whether the gesture is a valid gesture of the second device, and wherein the at least one memory and the computer program code are configured to, with the at least one processor, cause the apparatus to cause the indication of the gesture to be provided to the first device by causing the indication of the gesture to be provided to the first device in an instance in which the gesture is not a valid gesture of the second device.

16. An apparatus according to claim 15 wherein the at least one memory and the computer program code are further configured to, with the at least one processor, cause the apparatus to cause execution of an event associated with the gesture in an instance in which the gesture is a valid gesture of the second device.

17. A computer program product comprising at least one non-transitory computer-readable storage medium having computer-executable program code portions stored therein, the computer-executable program code portions comprising program instructions configured to:

cause interaction of a plurality of devices, comprising at least a first device and a second device, wherein interaction comprises: causing display of a first user interface currently being displayed upon a first display of the first device upon a second display of the second device and concurrently, causing display of at least a portion of information configured to be presented upon the second display of the second device on the second display of the second device, wherein the display of the user interface currently being displayed upon the first display and the information configured to be presented upon the second display is concurrently presented upon a single display, the single display being the second display;

receive, at the single display at which at least a portion of information configured to be presented upon the display of the plurality of devices is capable of being presented, an identification of one or more valid gestures of at least the first device of the plurality of devices;

while concurrently causing display, on the second display, of both (i) the user interface currently being displayed upon the first display and (ii) the information configured to be presented upon the second display, receiving, via the second display, information indicative of a sequence of input touch events introduced at least partially at a location on the second display presenting the user interface of the first device, wherein the sequence of input touch events comprises a device identification portion and a gesture portion, the device identification portion identifying with which respective device of the plurality of devices the at least one of the one or more valid gestures is associated, the gesture portion providing a gesture input, the gesture input causing one of a plurality of events capable of being performed to be performed, wherein a subset of the plurality of devices are associated with one or more valid gestures having a same gesture portion and a different device identification portion as other devices;

determine whether the sequence of input touch events is identified as a valid gesture of the first device; and based upon a determination that the device identification portion of the gesture identifies the first device and the gesture portion is a valid gesture for the first device, cause an indication of the gesture to be provided to the first device.

18. A computer program product according to claim 17 wherein a second one of the plurality of devices comprises the display, wherein the program instructions configured to determine whether the gesture is a valid gesture comprise program instructions configured to determine whether the gesture is a valid gesture of the first device, and wherein the program instructions configured to cause the indication of the gesture to be provided to the first device comprise program instructions configured to cause the indication of the gesture to be provided to the first device in an instance in which the gesture is a valid gesture of the first device.

19. A computer program product according to claim 17 wherein the first device comprises the display, wherein the program instructions configured to determine whether the gesture is a valid gesture comprise program instructions configured to determine whether the gesture is a valid gesture of the first device, and wherein the program instructions configured to cause the indication of the gesture to be provided to the first device comprise program instructions configured to cause the indication of the gesture to be provided to the first device in an instance in which the gesture is a valid gesture of the first device.

20. A computer program product according to claim 17 wherein a second one of the plurality of devices comprises the display, wherein the program instructions configured to determine whether the gesture is a valid gesture comprise program instructions configured to determine whether the gesture is a valid gesture of the second device, and wherein the program instructions configured to cause the indication of the gesture to be provided to the first device comprise program instructions configured to cause the indication of the gesture to be provided to the first device in an instance in which the gesture is not a valid gesture of the second device.

* * * * *